United States Patent
Chau et al.

(10) Patent No.: US 9,435,193 B2
(45) Date of Patent: *Sep. 6, 2016

(54) SONDE WITH INTEGRAL PRESSURE SENSOR AND METHOD

(71) Applicant: Merlin Technology, Inc., Kent, WA (US)

(72) Inventors: Albert W. Chau, Woodinville, WA (US); Dmitry Feldman, Seattle, WA (US); Benjamin John Medeiros, Orting, WA (US)

(73) Assignee: Merlin Technology, Inc., Kent, WA (US)

(*) Notice: Subject to any disclaimer, the term of this patent is extended or adjusted under 35 U.S.C. 154(b) by 170 days.

This patent is subject to a terminal disclaimer.

(21) Appl. No.: 14/174,024

(22) Filed: Feb. 6, 2014

(65) Prior Publication Data

US 2014/0150547 A1    Jun. 5, 2014

Related U.S. Application Data

(63) Continuation of application No. 13/071,302, filed on Mar. 24, 2011, now Pat. No. 8,662,200.

(51) Int. Cl.
*E21B 47/06* (2012.01)
*E21B 47/01* (2012.01)

(52) U.S. Cl.
CPC .............. *E21B 47/06* (2013.01); *E21B 47/011* (2013.01); *Y10T 29/49002* (2015.01)

(58) Field of Classification Search
CPC ....... E21B 47/011; E21B 47/02; E21B 47/18
See application file for complete search history.

(56) References Cited

U.S. PATENT DOCUMENTS

| | | |
|---|---|---|
| 4,455,875 A | 6/1984 | Guimard et al. |
| 5,715,827 A | 2/1998 | Corl et al. |
| 5,914,048 A | 6/1999 | Chase |
| 6,223,826 B1 | 5/2001 | Chau et al. |
| 6,470,979 B1 | 10/2002 | Wentworth et al. |

(Continued)

FOREIGN PATENT DOCUMENTS

WO       WO 01/23704 A1      4/2001

OTHER PUBLICATIONS

Herb Susmann, Ben Smith, Jed Sheckler; RivCross Operating Manual Version 1.01; Mar. 2004,Vector Magnetics LLC.

(Continued)

*Primary Examiner* — William P Neuder
(74) *Attorney, Agent, or Firm* — Pritzkau Patent Group, LLC

(57) ABSTRACT

Generally, a sonde, associated components and methods are described which can be used in conjunction with an inground tool having an inground tool housing that defines an inground tool cavity such that the inground tool cavity is exposed to an ambient pressure environment which surrounds the inground tool during an inground operation. A sonde housing assembly includes an exterior configuration that is receivable within the inground tool cavity. The sonde housing assembly at least partially defines a sonde interior and is further configured for receiving the pressure sensor body of a pressure sensor in a pressure sealed engagement. A sonde electronics package is supported within the sonde interior and is at least configured to receive the pressure signal and transfer a corresponding pressure signal from the sonde.

16 Claims, 6 Drawing Sheets

(56) References Cited

U.S. PATENT DOCUMENTS

| | | |
|---|---|---|
| 6,655,464 B2 | 12/2003 | Chau et al. |
| 6,839,000 B2 | 1/2005 | Das et al. |
| 6,845,822 B2 | 1/2005 | Chau |
| 6,932,154 B2 | 8/2005 | Zillinger |
| 7,336,562 B1 | 2/2008 | Hoyle et al. |
| 7,784,350 B2 | 8/2010 | Pelletier |
| 8,662,200 B2 * | 3/2014 | Chau .................. E21B 47/011 175/320 |
| 8,689,884 B2 * | 4/2014 | Young .................. E21B 47/187 166/320 |
| 2005/0205299 A1 | 9/2005 | Michael et al. |
| 2008/0087470 A1 | 4/2008 | Villareal et al. |
| 2011/0011594 A1 | 1/2011 | Young et al. |

OTHER PUBLICATIONS

The International Search Report and The Written Opinion of the International Searching Authority for International Application No. PCT/US2012/025541 which is associated with U.S. Appl. No. 13/071,302, filed Feb. 22, 2013, Alexandria, Virginia.

The Extended European Search Report of the European Patent Office for International Application No. PCT/US2012/025541 which is associated with U.S. Appl. No. 13/071,302, filed Oct. 28, 2015, Munich, Germany.

Office Action for Chinese Application No. 201280019466.5, which is associated with International Application No. PCT/US2012/025541 which is associated with U.S. Appl. No. 13/071,302, filed Nov. 26, 2015.

* cited by examiner

SONDE WITH INTEGRAL PRESSURE SENSOR AND METHOD

RELATED APPLICATION

This application is a continuation application of copending U.S. patent application Ser. No. 13/071,302 filed on Mar. 24, 2011, the disclosure of which is incorporated herein by reference.

BACKGROUND

The present application is generally related to the field of a sonde for use in inground operations and, more particularly, to a sonde having an integral pressure sensor and associated method.

Generally, an inground operation such as, for example, drilling to form a borehole, subsequent reaming of a borehole for purposes of installing a utility line and the like use a drill string that can carry a fluid to an inground tool that is disposed at an inground end of the drill string. The fluid can be carried at relatively high pressure by the drill string. For example, emitting the drilling fluid from a drill head, as the inground tool, can assist in cutting through inground formations. In some circumstances, the high pressure fluid can introduce problems since undue pressure can build up around the inground tool when the fluid is unable to flow back up the borehole without encountering significant constriction of the borehole surrounding the drill string. The pressure can be so significant as to cause disturbances that extend all the way to the surface of the ground which, for example, could damage a roadway. One form of surface damage can be referred to as "blistering". In other cases, the pressure buildup can cause the fluid to flow in an undesired manner as a contaminant, for example, into utility lines. In still other cases, sensitive environmental areas could be harmed. Applicants recognize that monitoring the pressure surrounding the inground tool can serve to avoid these problems.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, a sonde and associated method are described which can be used in conjunction with an inground tool having an inground tool housing that defines an inground tool cavity such that the inground tool cavity is exposed to an ambient pressure environment which surrounds the inground tool during an inground operation. The sonde includes a pressure sensor having a pressure sensor body. A sonde housing assembly includes an exterior configuration that is receivable within the inground tool cavity and the sonde housing assembly at least partially defines a sonde interior and is further configured for receiving the pressure sensor body of the pressure sensor in a pressure sealed engagement such that the sonde interior is pressure sealed from the ambient pressure environment and the pressure sensor produces a pressure signal responsive to the ambient pressure environment outside of the sonde housing assembly. A sonde electronics package is supported within the sonde interior and is at least configured to receive the pressure signal and transfer a corresponding pressure signal from the sonde.

In another aspect of the present disclosure, a sonde assembly and an associated method are described for use in conjunction with an inground tool having an inground tool housing that defines an inground tool cavity such that the inground tool cavity is exposed to an ambient pressure environment which surrounds the inground tool during an inground operation. The sonde assembly includes a sonde housing arrangement having an exterior configuration that is receivable within the inground tool cavity. The housing arrangement defines a sonde interior that is configured to receive a pressure sensor body of a pressure sensor in a pressure sealed engagement such that the sonde interior is pressure sealed from the ambient pressure environment and the pressure sensor produces a pressure signal responsive to the ambient pressure environment outside of the housing arrangement. The housing arrangement is further configured to support at least a sonde electronics package within the sonde interior to receive the pressure signal.

In still another aspect of the present disclosure, an end cap assembly and associated method are described for use as part of a sonde that is itself configured for use in an inground tool having an inground tool housing that defines an inground tool cavity such that the inground tool cavity is exposed to an ambient pressure environment which surrounds the inground tool during an inground operation. The sonde includes a sonde body defining an open end. The end cap assembly includes an end cap body that is receivable by the open end of the sonde body for pressure sealing engagement therewith and defines a pressure sensor aperture for receiving a pressure sensor body of a pressure sensor in a pressure sealed engagement for producing a pressure signal.

In addition to the exemplary aspects and embodiments described above, further aspects and embodiments will become apparent by reference to the drawings and by study of the following descriptions.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 1a is a diagrammatic view, in perspective of an embodiment of a sonde that is produced in accordance with the present disclosure.

FIG. 1b is a diagrammatic further enlarged partial view of one end of the sonde of FIG. 1a.

DETAILED DESCRIPTION

Figure 1:
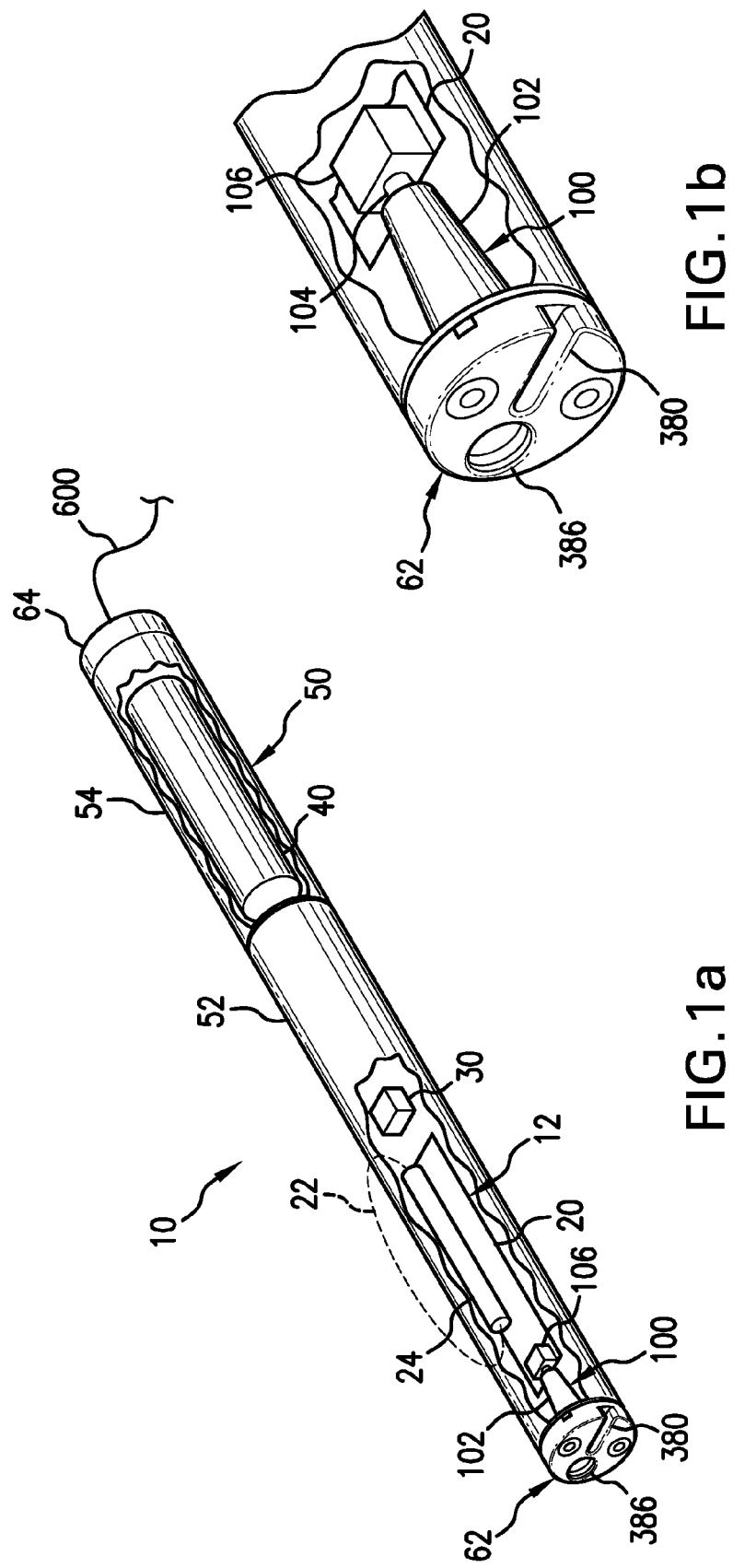

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, up, down, upper, lower, left, right, inner, outer and the like may be used with respect to these descriptions, however, this terminology has be adopted with the intent of facilitating the reader's understanding and is not intended as being limiting. Further, the figures are not to scale for purposes of illustrative clarity.

Turning now to the figures wherein like components are indicated by like reference numbers throughout the various figures, attention is immediately directed to FIG. 1*a* which is a diagrammatic view, in perspective, of an embodiment of an sonde, generally indicated by the reference number 10, and produced in accordance with the present disclosure. Sonde 10 can be used in any suitable inground operation such as, for example, vertical drilling, horizontal directional drilling, pullback operations for installing utilities, mapping operations, combinations of these operations and in other types of operations. In an embodiment, the sonde can comprise a steering tool. The term sonde, as used herein, refers to an arrangement that includes at least one sensor that produces a sensor signal and at least the capability to transmit or transfer the sensor signal and/or one or more signals that are produced responsive to the sensor signal.

Sonde 10 includes a sonde electronics package 12 that can include, by way of example, a transmitter 20 which, in some embodiments, can transmit a locating signal 22 such as, for example, a dipole locating signal (illustrated by a single flux line) from a dipole antenna 24, although this is not required. In some embodiments, the electronics assembly can include a transceiver, as opposed to a transmitter, that can receive an electromagnetic signal which is generated by other inground components such as, for example, a tension monitoring arrangement as described in commonly owned U.S. patent application Ser. No. 13/035,774 entitled DRILL STRING ADAPTER AND METHOD FOR INGROUND SIGNAL COUPLING, which is incorporated herein by reference. The present example will assume that the electromagnetic signal is a locating signal in the form of a dipole signal for descriptive purposes. Accordingly, the electromagnetic signal may be referred to as a locating signal. It should be appreciated that the dipole signal can be modulated like any other electromagnetic signal and that the modulation data is thereafter recoverable from the signal. The locating functionality of the signal depends, at least in part, on the characteristic shape of the flux field and its signal strength rather than its ability to carry modulation. Thus, modulation is not required. Information regarding certain parameters of the sonde such as, for example, pitch and roll (orientation parameters) and temperature can be measured by a suitable sensor arrangement 30 located within the sonde which can include, for example, a pitch sensor, a roll sensor, a temperature sensor, an AC field sensor for sensing proximity of 50/60 Hz utility lines and any other sensors that are desired such as, for example, a DC magnetic field sensor for sensing yaw orientation (a tri-axial magnetometer, with a three axis accelerometer to form a electronic compass to measure yaw orientation). It is noted that the sensor arrangement has been shown separate from transmitter 20 for illustrative purposes, however, the transmitter or transceiver can be provided as a circuit board assembly that directly supports and interfaces at least some of the sensors. Electrical connections to other sensors can be provided with the sensor positioned at any suitable location for sensing a parameter of interest. Transmitter 20 can include a processor. A battery 40 can be provided within the sonde for providing electrical power. The battery can be made up of individual conventional battery cells such as, for example, C cells based on the diameter of a main body or main housing 50 of the sonde. The main housing can be cylindrical with a circular cross-section and can be made up of two cylindrical sections that are adjoined to one another. In one embodiment, the housing body can include a first main body portion 52 that can be formed from an electrically insulative and non magnetic material, and which can be referred to as a transceiver or transmitter housing portion which allows locating signal 22 to pass therethrough. For purposes of convenience, the first main body portion may be referred to hereinafter as a transmitter housing portion, although it is to be understood that any suitable electronics package can be received therein including but not limited to a transmitter or a transceiver. Suitable materials for the body of the transmitter portion include, by way of non-limiting example, high strength plastic, such as glass fill nylon and polycarbonate, or composite material such as fiberglass. A second main body portion 54 can be referred to hereinafter as a battery housing portion and can be formed from an electrically conductive material such as, for example, stainless steel, nickel plated brass, nickel plated steel or nickel plated stainless steel. In some cases, the battery housing portion can serve as an electrical conductor to carry current from an end of battery 40 that is most remote from the transmitter housing portion. Each housing portion can be configured to withstand an inground environment to which the sonde may be exposed. Individual electrical connections between the various components of the sonde may not be shown for purposes of illustrative clarity but are understood to be present. The battery housing portion and the transceiver or transmitter housing portion can be assembled, for example, using threaded engagement with a suitable sealant material applied to the threads and/or using one or more sealing members such as O-rings. First and second end cap arrangements 62 and 64, respectively, are used to close the opposing ends of the sonde body as defined by the adjoined battery housing portion and transmitter housing portion. Second end cap arrangement 64 can be integrally formed from a suitable material such as, for example, stainless steel, nickel plated brass, nickel plated steel or nickel plated stainless steel. The second end cap can be received in a free end of battery housing portion 54, for example, using threaded engagement, an interference fit, and/or suitable sealing materials. As will be further described, first end cap arrangement 62 can comprise an assembly which supports a pressure sensor assembly 100. Accordingly, the first end cap arrangement can be referred to hereinafter as a pressure sensor end cap arrangement.

Referring to FIG. 1b in conjunction with FIG. 1a, the former is a further enlarged diagrammatic partial view of the end of sonde 10 which includes pressure sensor end cap arrangement 62 to illustrate additional details of its structure. In the present embodiment and by way of example, the pressure sensor end cap assembly can include a pressure sensor assembly 100 including a body 102 that supports an electrical connector 104 at a distal end of the body. Connector 104 is removably connectable to a receptacle 106 that can be supported, for example, by the circuit board assembly of transmitter or transceiver 20. Sensor body 102 can be formed, for example, from a suitable potting compound supporting a pressure sensor at one end and electrical connector 104 at an opposing end with suitable electrical conductors extending therebetween. It should be noted that the pressure sensor itself is not visible in the views of FIGS. 1a and 1b, but will be shown in figures yet to be described. Based on the configuration of first end cap arrangement 62, which can be referred to interchangeably as the sensor end cap arrangement, the pressure sensor assembly can be removably installed for ease of replacement, even in the field. In another embodiment, yet to be illustrated, electrical conductors can extend from the pressure sensor to the circuit board assembly and electrically connected to the circuit board assembly in any suitable manner.

Figure 2:
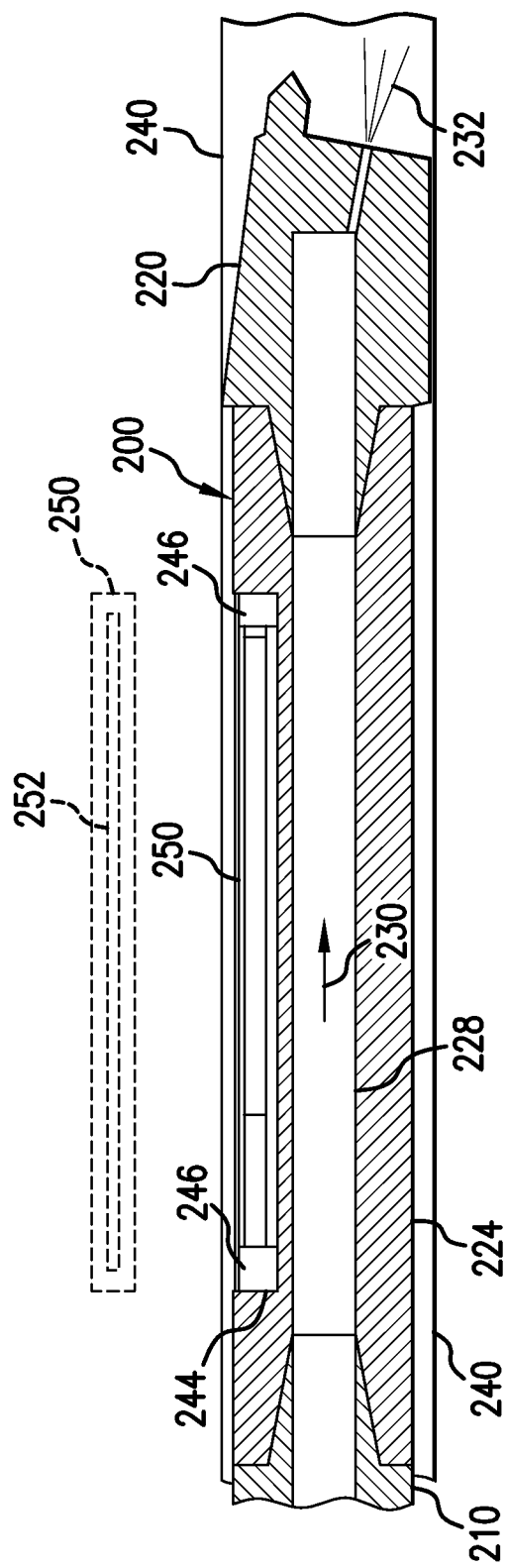
FIG. 2 is a diagrammatic view, in elevation, showing the sonde of FIGS. 1a and 1b received within an inground housing.

FIG. 2 is a diagrammatic elevational view of an inground housing 200 which defines an opposing pair of end fittings. In the present example, both end fittings are box fittings as will be recognized by one having ordinary skill in the art, however, any suitable combination of box and pin fittings may be used. A distal or inground end 210 of the drill string (only partially shown) engages one end of inground housing 200 while a drill head 220 engages an opposing end of inground housing 200. The inground housing includes a housing body 224 which defines a through passage 228 for conducting a fluid 230 (shown as an arrow) that can be emitted as jets 232 from the drill head to assist in forming a borehole 240. Fluid 230 can therefore become confined and produce pressure in passing up the borehole between the drill string and the interior sidewalls of the borehole such that the pressure around the inground housing is indicative of the status of the fluid. That is, if the fluid is unable to travel sufficiently freely up the borehole, the pressure can increase until the borehole is unable to support the pressure. It should also be appreciated that pressure can arise from within the ground itself which is generally referred to as pore pressure. The pore pressure can be detected, for example, when fluid 230 is not being injected. Through measurement of pore pressure Applicant recognizes that the height of the water table can be determined.

Referring to FIGS. 1a, 1b and 2, sonde 10 is received in a housing cavity 244 of inground housing 224, for example, supported by indexing blocks 246, as will be further described. A cover 250 is removably receivable on the inground housing to close housing cavity 244 with the sonde installed. Cover 250 is additionally shown in phantom in a plan view to illustrate a slot 252 which can allow for the emission of locating signal 22. In this regard, it should be appreciated that slot 252 also allows for the flow of fluid 230 into the housing cavity such that sonde 10 is exposed to pressure that is present in the borehole. Thus, the sonde is exposed to the ambient pressure in the borehole. The sonde can be received with transceiver housing portion 52 oriented either toward the drill head or away from the drill head.

Figure 3:
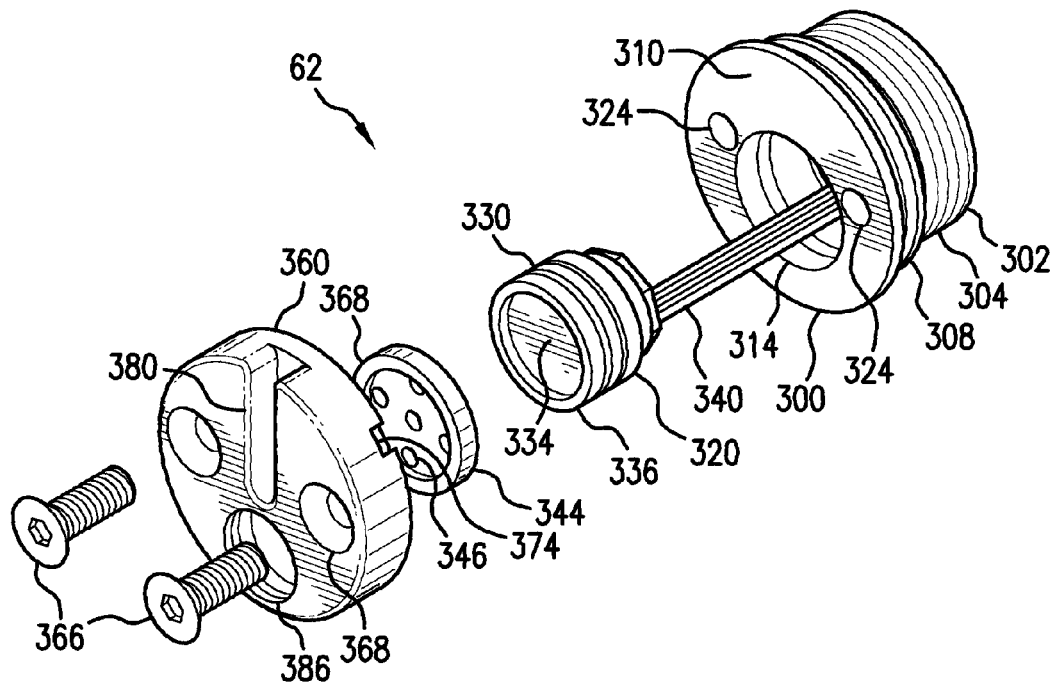
FIG. 3 is an exploded perspective view of an embodiment of a pressure sensor end cap arrangement that can be used at least as part of the sonde of FIGS. 1a and 1b.
Figure 4:
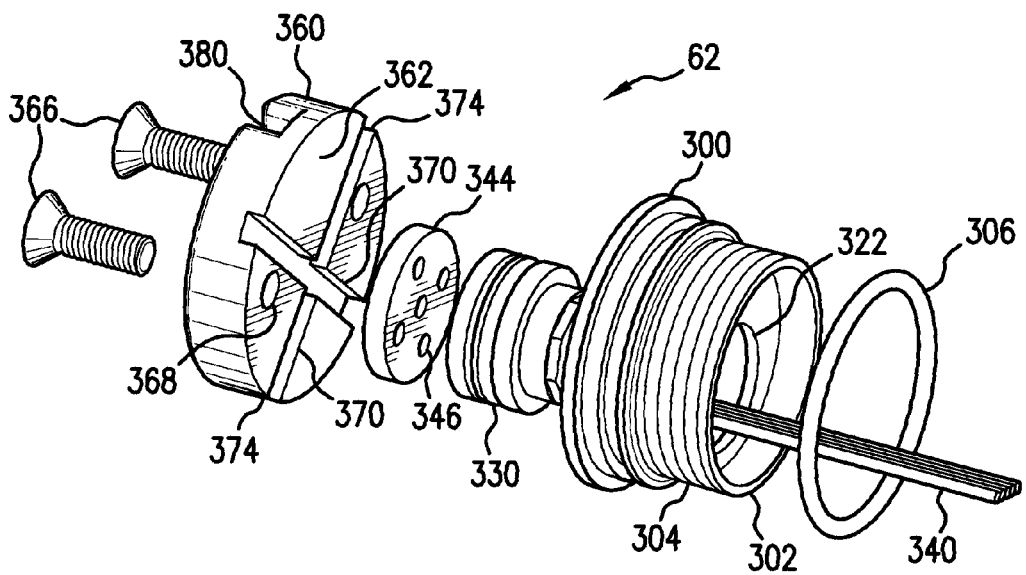
FIG. 4 is another exploded perspective view of an embodiment of a pressure sensor end cap arrangement that can be used at least as part of the sonde of FIGS. 1a and 1b.
Figure 5:
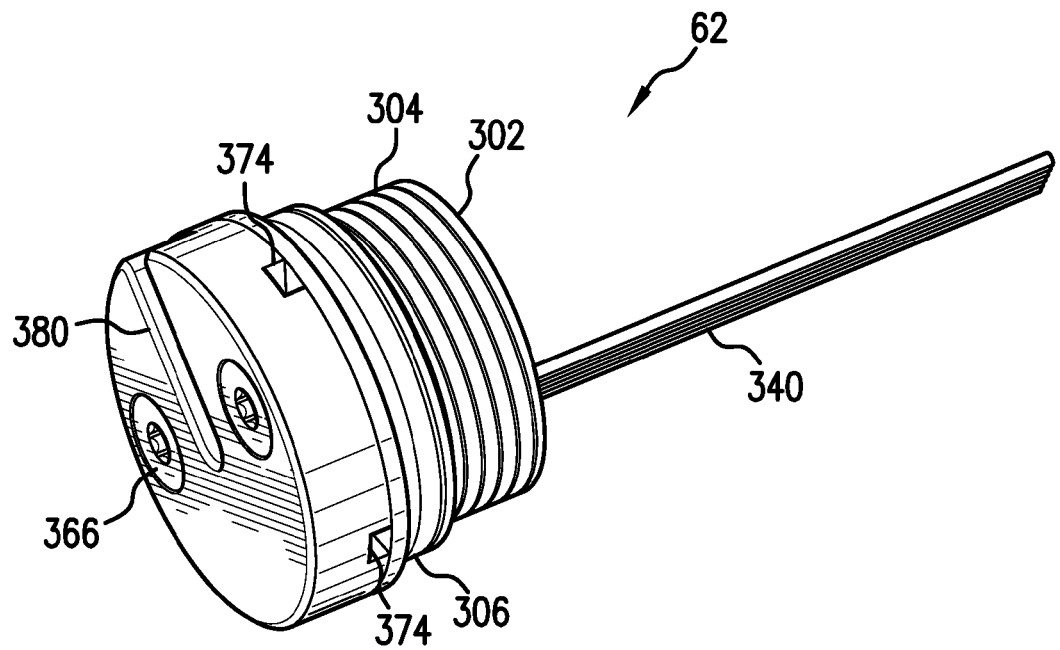
FIG. 5 is an assembled perspective view of the pressure sensor end cap arrangement of FIGS. 3 and 4.

Turning now to FIGS. 3 and 4, pressure sensor end cap arrangement 62 is shown in exploded perspective views to illustrate details of an embodiment while FIG. 5 illustrates an assembled perspective view of the embodiment. The arrangement includes a pressure sensor end cap 300 that can be configured having an inset end 302 that is receivable in a free end of transmitter housing portion 52 (FIGS. 1a and 1b). The inset end can include threads 304 for example, to provide for threaded engagement or an interference fit engagement, for example, wherein threads 304 can be annular features that enhance an interference fit. It should be appreciated that suitable sealing materials can be used either alone or in conjunction with threaded or interference engagement. In the present embodiment, an O-ring 306 is receivable in an O-ring groove 308 to seal or supplementally seal between the end cap and the transmitter housing portion. It should be appreciated that pressure sensor end cap 300 can be permanently installed on the transmitter housing portion for reasons which will become evident. An outer end of the pressure sensor end cap includes a face 310 that defines a sensor aperture 314 that is configured for receiving a pressure sensor 320 against an aperture seat that is defined as a floor of the sensor aperture surrounding a through passage 322. Any suitable pressure sensor can be used with the configuration of aperture 314 adjusted accordingly, however, one suitable pressure sensor has been found to be the Model 86-300A sensor produced by Measurement Specialties. It is noted that the sensor aperture may be offset from the center of the face of the pressure sensor end cap. Face 310 further defines entrance openings of a pair of threaded apertures 324. Sensor 320 is configured with an O-ring 330 to form a pressure seal against an interior sidewall of sensor aperture 314, although different or additional pressure sealing expedients can be employed. The pressure sensor further includes a pressure sensor diaphragm 334 that is surrounded by a peripheral sensor rim 336. An electrical cable 340 such as, for example, a ribbon cable extends from pressure sensor 320 having electrical conductors on which a pressure sensor signal is available. It is noted that the various conductors of the ribbon cable can include, for example, reference conductors, signal conductors and a signal ground. A filter disc 344 defines a plurality of filter holes 346 having a diameter that limits exposure of the sensor diaphragm to contaminants that might damage the diaphragm. The filter disc includes an overall diameter that is at least approximately the same as the diameter of pressure sensor 320 such that the filter disc is receivable in sensor aperture 314. The latter also includes a depth to the aperture seat that accommodates seating the sensor against the aperture seat while supporting filter disc 344 against peripheral sensor rim 336 with the filter disc also received in the sensor aperture. A sensor cover 360 includes a sensor cover end face 362 that is receivable against end face 310 of the pressure sensor end cap such that the sensor cover can be removably mounted, for example, using threaded fasteners 366 passing through sensor cover openings 368 and into threaded apertures 324 of the pressure sensor end cap. Filter disc 344 further defines a filter disc peripheral rim 368 that is positioned against sensor cover end face 362 when the filter disc is captured between the mounted sensor cover and pressure sensor 330 within the sensor aperture. The filter disc can be formed from any suitable material including but not limited to plastic or metal. Suitable plastics include acetal, nylon and UHMW pe [Ultra-High-Molecular-Weight polyethylene]. Suitable metals include, for example, stainless steel.

Turning to FIG. 5, in conjunction with FIGS. 3 and 4, the former is an assembled view, in perspective, of pressure sensor end cap assembly 62. Sensor cover 360 defines one or more grooves 370 (FIG. 4) in sensor cover end face 362 which define external fluid openings 374 (see especially, FIG. 5) for admitting fluid and thereby the ambient pressure such that sensor diaphragm 334 is exposed to the ambient pressure surrounding the sonde. It should be appreciated that grooves 370 and filter disc peripheral rim 368 cooperate to provide paths through which the ambient pressure is conducted to diaphragm 334 of the pressure sensor. An indexing slot 380 can be engaged with a complementary feature of one of indexing blocks 246 (FIG. 2) to support sonde 10 in a selected roll orientation. It should be appreciated that the pressure passages which lead from outside the pressure sensor end cap assembly to the diaphragm of the pressure sensor can be defined as non line-of-sight circuitous paths so as to protect the diaphragm of the pressure sensor from external damage. It is noted that FIGS. 1 and 3 each illustrate a temperature button 386 which is optional and can receive a material that reacts when exposed to a certain temperature, for example, to establish that the sonde has been exposed to an over temperature condition. Protection of pressure diaphragm 334 from freezing water can be provided in any suitable manner, if needed. For example, the passages leading from openings 374 to the pressure sensor can be at least partially packed with a suitable grease such as a silicone grease. As another example, a compliance member such as a closed cell foam (e.g., a layer of a silicone closed cell foam) can be positioned between pressure sensor 330 and filter disc 344. In view of the foregoing, it should be appreciated that the pressure sensor can be replaced by removing cover 360 without the need to remove pressure sensor end cap 300 from the main body of the sonde. Cable 340 can readily be configured as sufficiently rigid to engage a connector receptacle in the manner illustrated by FIG. 1a with respect to receptacle 106. In another embodiment, the arrangement shown in FIGS. 1a and 1b can be used, for example, by forming body 102 that encapsulates electrical conductors leading from the pressure sensor to a suitable electrical connector. Suitable encapsulants include potting compounds such as, for example, low durometer polyurethane, any suitable type of electronic grade RTV or epoxy.

Figure 6:
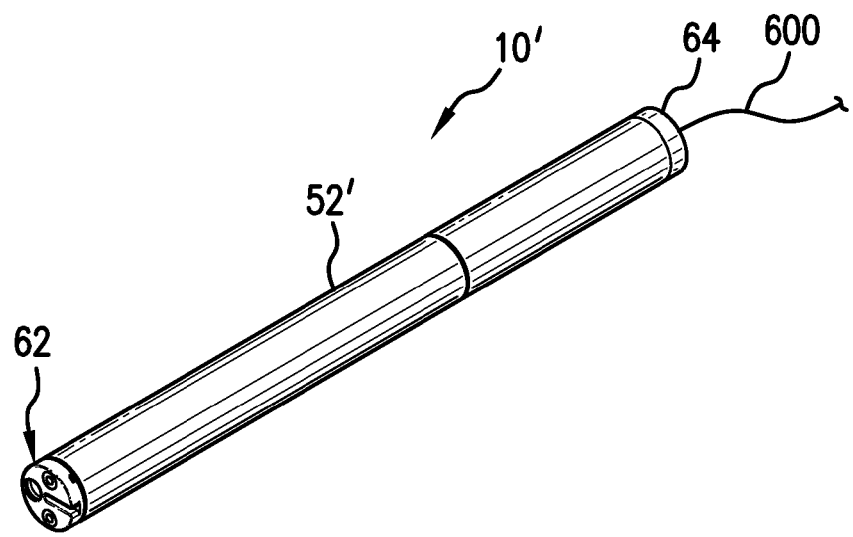
FIG. 6 is a diagrammatic perspective view of an embodiment of another sonde that is configured with a cable for connection to a wire-in-pipe arrangement.

Attention is now directed to FIG. 6 which illustrates a sonde that is generally indicated by the reference number 10' and produced in accordance with the present disclosure. In one embodiment, sonde 10' can be configured in the same manner as sonde 10 of FIG. 1 with the exceptions that battery 40 and battery portion 54 of the main body are not used. Further, a main housing body 52' can provide for emission of a locating or other electromagnetic signal, if an appropriate transmitter is housed by the sonde and/or for reception of an electromagnetic signal from an aboveground location. In an embodiment, a cable 600 can extend from second end cap 64 for electrical connection, for example, to a wire-in-pipe arrangement. A suitable wire-in-pipe arrangement is described in U.S. Pat. Nos. 6,223,826, 6,655,464 and 6,845,822 which are commonly owned with the present application and hereby incorporated by reference. Power can be provided from the drill rig, to the wire-in-pipe arrangement, and to cable 600, as will be familiar to one having ordinary skill in the art. The wire-in-pipe conductor can be used to carry electrical power to the sonde, thereby eliminating the need for a battery, and/or to carry electrical signals between the drill rig and sonde such as, for example, a pressure signal from the sonde to the drill rig. In some embodiments, it may not be necessary to transfer an electromagnetic signal through the main body housing, in which case main housing body 52' can be formed from an electrically conductive material. In another embodiment, a battery and battery compartment can be provided as shown in FIG. 1 along with cable 600.

Figure 7:
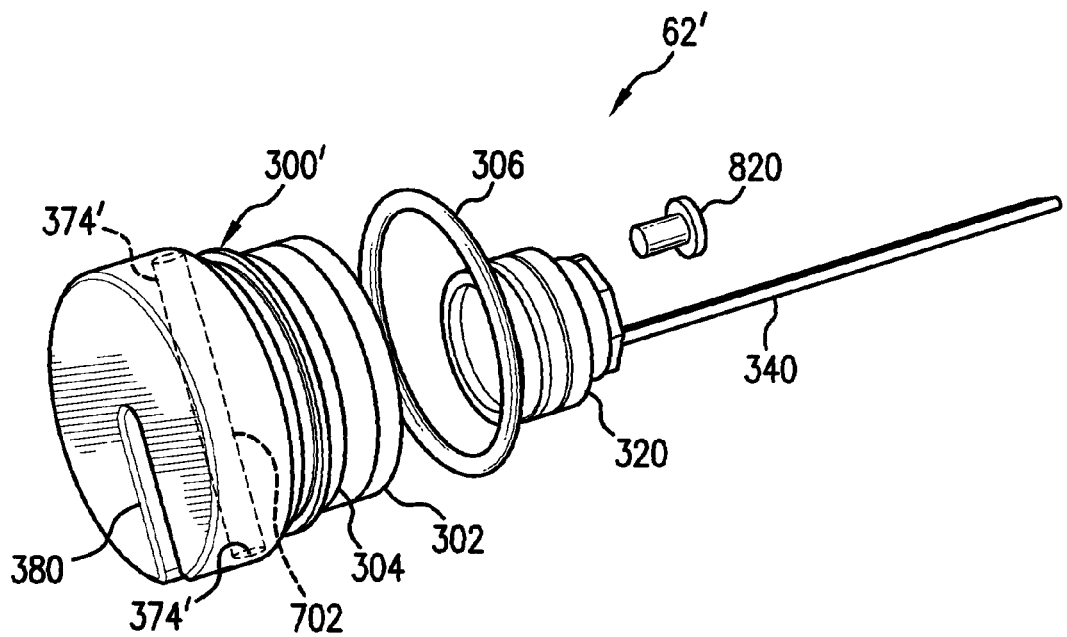
FIG. 7 is a perspective exploded view of another embodiment of a pressure sensor end cap arrangement that can be used at least in place of the pressure sensor end cap shown, for example, in FIGS. 3 and 4.

Attention is now directed to FIG. 7 which is a perspective exploded view of another embodiment of a first pressure sensor end cap arrangement that is generally indicated by the reference number 62' which can be used in any of the sondes that have been described above. Since certain components and features from first pressure sensor end cap arrangement 62 (FIGS. 3-5) are also used in FIG. 7, descriptions of such like components and features may not be repeated for purposes of brevity. As is the case with aforedescribed end cap arrangement 62, end cap arrangement 62' includes a modified pressure sensor end cap 300' that can be integrally formed, for example, by machining from a suitable material such as, for example, stainless steel, nickel plated brass, nickel plated steel or nickel plated stainless steel. A first one of a pair of pressure conducting passages 702, shown using dashed lines, extends between external fluid openings 374'. A second passage of the pair can be formed opposite indexing groove 380 with respect to the first passage, but is not shown in the present figure due to illustrative constraints.

Figure 8:
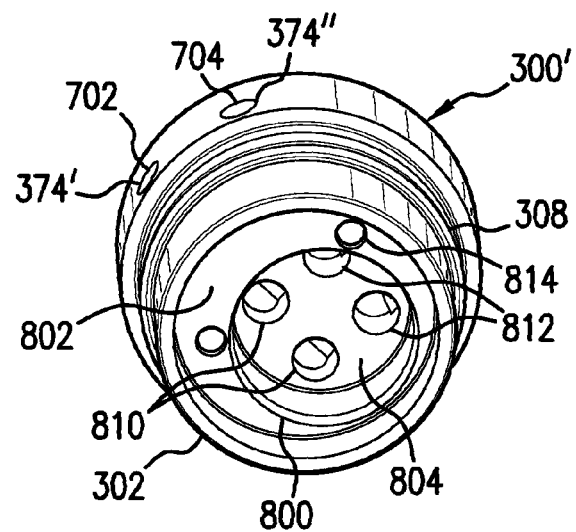
FIG. 8 is a perspective rear view of a modified pressure sensor end cap which forms part of the pressure sensor end cap arrangement of FIG. 7.

Turning to FIG. 8 in conjunction with FIG. 7, the former is a perspective rear view of modified pressure sensor end cap 300', shown here to illustrate additional details with respect to its structure. In particular, one entrance opening 374' of first passage 702 can be seen as well as one entrance opening 374" of another pair of entrance openings between which a second passage 704 of the pair of passages extends. A sensor aperture 800 is defined in an end cap floor 802 from which inset end 302 extends outwardly. Sensor aperture 800 is configured to receive pressure sensor 320 with pressure diaphragm 334 of the sensor confronting a floor 804 of the sensor aperture. A first pair of branch pressure conducting passages 810 are formed in sensor aperture floor 804 and lead from the aperture floor into pressure conducting passage 702 while a second pair of branch pressure conducting passages 812 are formed in pressure sensor aperture floor 804 and lead into second pressure passage 704. The branch pressure conducting passages can be formed, for example, by drilling using a depth limit. It should be appreciated that the particular arrangement of passages that conduct pressure to the sensor is provided by way of example and that a wide variety of modifications can be provided by one of ordinary skill in the art having this overall disclosure in hand. In is noted that the branch pressure passages function in a manner that is similar to that of openings 346 of filter disc 368 (FIGS. 3 and 4) by limiting the size of contaminants that are able to pass therethrough. The present embodiment offsets sensor aperture 800 in end cap floor 802, although this is not required, with a pair of threaded openings 814 (one of which is explicitly designated) arranged adjacent to sensor aperture 800. A pair of fasteners 820, one of which is shown and designated in FIG. 7, are receivable in openings 810 such that sensor 320 can be captured by the head of each of the fasteners and the pressure sensor can be removably installed. It should be appreciated that other expedients may be used for retaining the pressure sensor such as, for example, using a single fastener. Modified pressure sensor end cap 300' can be installed in aforedescribed bodies 52, 52' or other suitable cylindrical bodies for removable replacement, for example, using threaded engagement or an interference fit so that pressure sensor 320 is replaceable. It should be appreciated that the pressure passages that lead from outside the pressure sensor end cap assembly to the diaphragm of the pressure sensor can be defined as non line-of-sight circuitous paths so as to protect the diaphragm of the pressure sensor from external damage. As described above, the pressure passages can be packed with a suitable grease to avoid freezing damage to the pressure sensor and/or a suitable foam disc can be installed in sensor aperture 800 prior to inserting pressure sensor 320.

Figure 9:
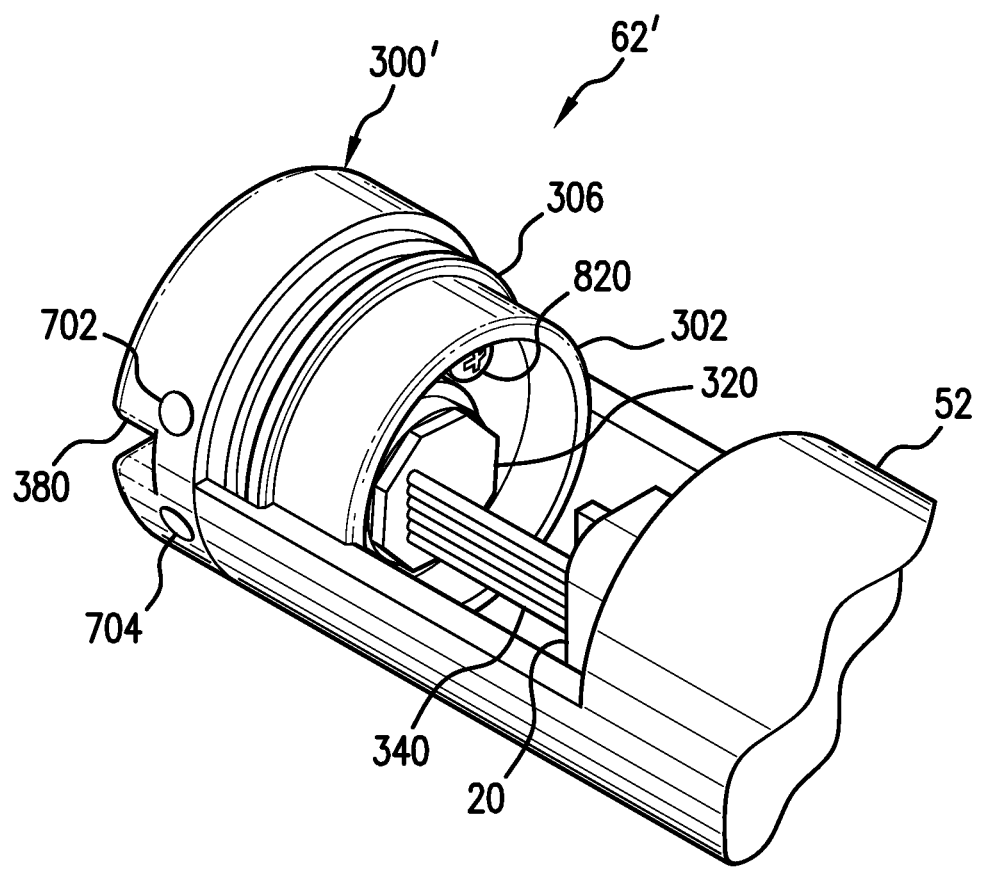
FIG. 9 is a perspective assembled and partially cut-away view of the pressure sensor end cap arrangement of FIG. 7 shown received on a sonde main body and interfaced with an electronics package of the sonde.

FIG. 9 is a perspective assembled and partially cut-away view of pressure sensor end cap arrangement 62' installed in main body portion 52 with the latter partially shown and partially cut-away to illustrate details of the installed configuration. In particular, sensor 320 is installed and retained by fasteners 820 with cable 340 extending to a receptacle on transmitter 20.

The foregoing description of the invention has been presented for purposes of illustration and description. It is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. A sonde for use in an inground tool having an inground tool housing that defines an inground tool cavity such that the inground tool cavity is exposed to an ambient pressure environment which surrounds the inground tool during an inground operation, said sonde comprising:
    an elongated main body having first and second opposing ends;
    first and second end caps that are receivable by said first and second opposing ends, respectively, of said main body in pressure sealing engagement with the main body such that the main body with the first and second end caps installed thereon is receivable in the inground tool cavity and the first end cap defines a pressure sensor aperture; and
    a pressure sensor having a pressure sensor body that is receivable in said pressure sensor aperture in pressure sealing engagement with the first end cap such that the first end cap, the second end cap, the elongated main body and the pressure sensor cooperate to define a sonde interior that is pressure sealed from the ambient pressure environment while the pressure sensor is supported to produce a pressure signal responsive to the ambient pressure environment; and
    a sonde electronics package that is supported within the sonde interior and is at least configured to receive said pressure signal and transfer a corresponding pressure signal from the sonde.

2. The sonde of claim 1 wherein said main body defines an inner surface and said first and second end caps are each configured with an exterior surface for engaging said inner surface.

3. The sonde of claim 2 wherein said exterior surface of each of said first and second endcaps is configured with an o-ring groove for receiving an o-ring that is captured between each endcap and the main body to at least partially pressure seal each of the first and second endcaps against the inner surface of the main body.

4. The sonde of claim 1 wherein said first end cap is configured for receiving a cover that retains the pressure sensor within the sensor aperture.

5. The sonde of claim 4 wherein the pressure sensor includes a pressure diaphragm and wherein said cover defines at least one non-line-of-sight circuitous path to provide pressure communication to the pressure diaphragm from outside the first end cap and the sensor aperture is configured such that the pressure diaphragm faces an inner surface of the cover when captured in the sensor aperture by the cover.

6. The sonde of claim 4 wherein said cover is removably engagable with the first end cap.

7. The sonde of claim 6 wherein said first end cap is configured for receiving at least a threaded fastener to hold the cover in removable engagement with the first end cap.

8. The sonde of claim 4 wherein said cover defines at least one pressure passage that leads to the pressure sensor from outside the cover when removably engaged with the first end cap.

9. The sonde of claim 8 wherein the pressure passage defines a non-line-of-sight circuitous path leading to the pressure sensor from outside the cover.

10. The sonde of claim 8 including a filter member that is received with the pressure passage.

11. The sonde of claim 10 wherein the filter member is a filter disc.

12. The sonde of claim 1 wherein said first end cap defines said sensor aperture for removably receiving the sensor such that the pressure sensor is accessible and replaceable only with the first end cap removed from said main body.

13. The sonde of claim 12 wherein the pressure sensor includes a pressure diaphragm and the sensor aperture is configured such that the pressure sensor is receivable against a floor of the sensor aperture and the pressure diaphragm confronts said floor and at least one pressure conducting passage is defined passing through the floor to provide pressure communication with the ambient pressure environment.

14. The sonde of claim 12 wherein said first end cap is integrally formed and defines at least one pressure passage that leads to the pressure sensor from outside the first end cap.

15. The sonde of claim 14 wherein the pressure passage defines a non-line-of-sight circuitous path leading to the pressure sensor from outside the first end cap.

16. A sonde for use in an inground tool having an inground tool housing that defines an inground tool cavity such that the inground tool cavity is exposed to an ambient pressure environment which surrounds the inground tool during an inground operation, said sonde comprising:
    an elongated main body having first and second opposing ends;
    first and second end caps that are receivable by said first and second opposing ends, respectively, of said main body in pressure sealing engagement with the main body for installation in the inground tool cavity and the first end cap defines a pressure sensor aperture for receiving a pressure sensor having a pressure sensor body that is receivable in said pressure sensor aperture in pressure sealing engagement with the first end cap such that the first end cap, the second end cap, the elongated main body and the pressure sensor cooperate to define a sonde interior that is pressure sealed from the ambient pressure environment while the pressure sensor is supported to produce a pressure signal responsive to the ambient pressure environment; and a sonde electronics package that is supported within the sonde interior and is at least configured to receive said pressure signal and transfer a corresponding pressure signal from the sonde.

* * * * *